W. Shires.
Garbage-Can.

No 73130  Patented Jan. 7, 1868.

Witnesses

Inventor
W. Shires
By Knight Bros
Attys

United States Patent Office.

WILLIAM SHIRES, OF CINCINNATI, OHIO.

Letters Patent No. 73,130, dated January 7, 1868.

IMPROVED GARBAGE-CAN OR VESSEL.

*The Schedule referred to in these Letters Patent and making part of the same.*

TO WHOM IT MAY CONCERN:

Be it known that I, WILLIAM SHIRES, of Cincinnati, Hamilton county, Ohio, have invented a new and useful Garbage Vessel; and I hereby declare the following to be a full, clear, and exact description thereof, reference being had to the accompanying drawings, making part of this specification.

The object of my invention is to provide a fire-proof and indestructible receptacle, of a portable character, for the ashes and other daily refuse of a store, shop, or dwelling. In the accompanying drawings—

Figure 1:
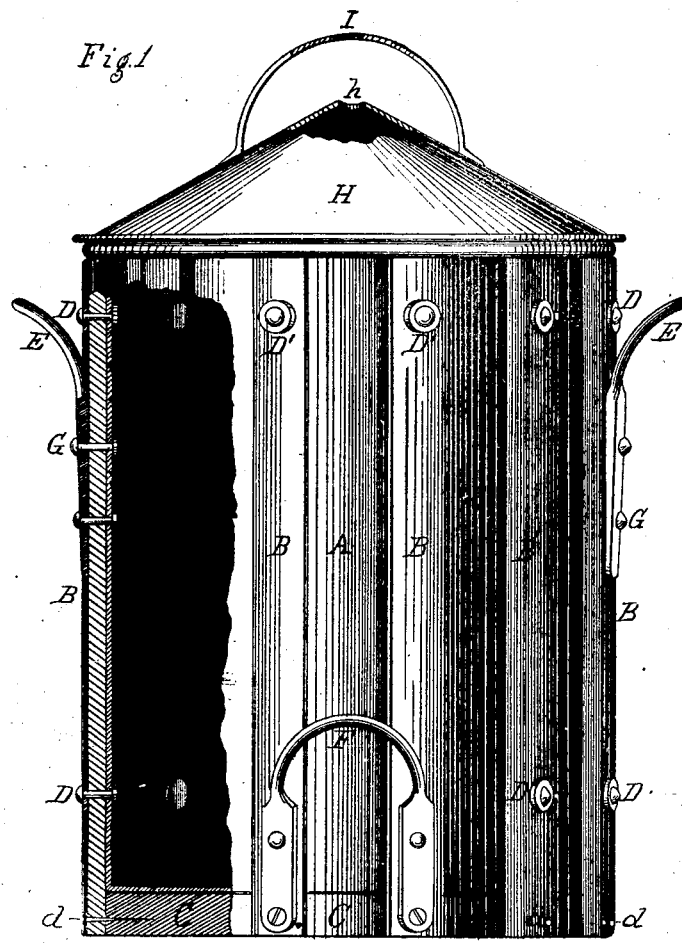
Figure 1 is an elevation, partially in section, of a garbage-vessel embodying my improvements, the section being taken at the line $x$ $x$ of fig. 2.
Figure 2:
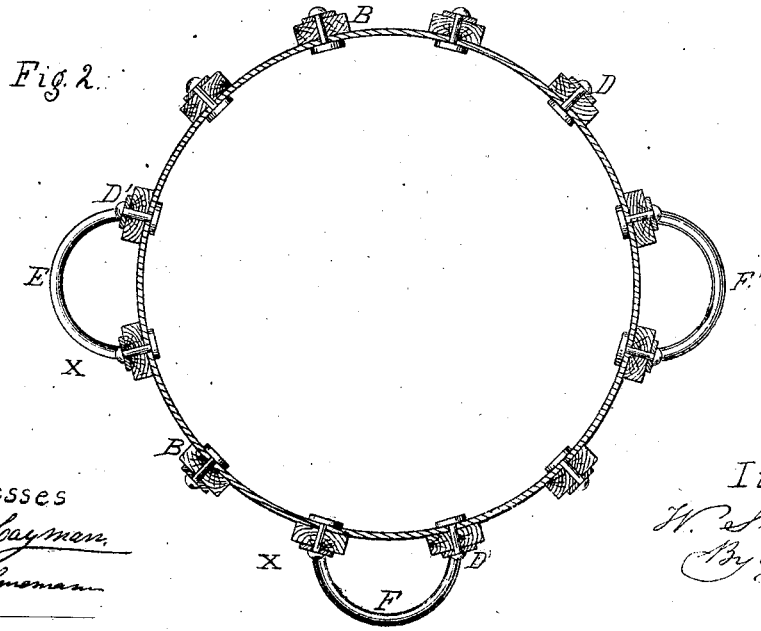
Figure 2 is a horizontal section through the same.

The body of my garbage-vessel consists of a sheet-metal cylinder, A, of any desired dimensions or material, and the sides of this cylinder are stiffened on their outside by means of a series of wooden staves or ribs, B, while its bottom, also of sheet metal, is protected by a wooden disk or base, C, of corresponding diameter, underneath it. The staves B extend from the top of cylinder A to the bottom of the base, C, and are secured to the outside of the cylinder by means of bolts or rivets D D', and to the base by means of nails $d$, which, passing through the staves, near their lower ends, enter the periphery of the base. Previous to attaching the wooden base, its upper surface and the lower surface of the metal bottom are well coated with tar or paint, to prevent decay and rust. Only two rows of rivets are shown in the drawings, but it is evident that a greater number may be employed should the length of the vessel demand it.

In order to enable the vessel to be carried about and emptied with facility, I provide it with three handles E E' F, of which the handles E E' are placed near the top, and diametrically opposite each other, while the other one, F, is near the bottom, and located midway between the other two. These handles are attached to the vessel by rivets G, which also assist in securing the staves to the body. The vessel may be provided with a cap or cover, H, of the represented "pitched" or conical form, with a handle, I, and a small ventage, $h$, for gas or vapor.

The body of the vessel being of sheet metal, may receive red-hot coals or cinders without injury, and the staves around the outside and the wooden base impart stiffness to the vessel, and prevent it being indented and otherwise injured by the rough handling incident to its daily use in emptying over the sides of the cart and otherwise.

I have described my vessel in its most preferred form, and one which practice has proven to be convenient and durable, but it is evident that the shape of the vessel may be altered without departing from the principle of the invention; as, for example, the body may have a rectangular, octagonal, or other horizontal section, and may taper upward or downward. A flat or other formed cover, with hinge or hinges, may be substituted for the detached "pitch" cover here represented.

It is my intention to attach a portable ash-sifter, in form similar to the steamer of a pot or boiler, the same cover fitting both vessel and sifter, the sifting-mechanism being inside of the upper vessel; but as I purpose making the same the subject of a distinct patent, a further description here is deemed unnecessary.

I claim herein as new and of my invention—

A garbage-vessel, consisting of the sheet-metal body A, wooden staves B, and base, C, for the purpose set forth.

In testimony of which invention I hereunto set my hand.

WM. SHIRES.

Witnesses:
GEO. H. KNIGHT,
JAMES H. LAYMAN.